(12) United States Patent
Zhang et al.

(10) Patent No.: US 9,113,002 B2
(45) Date of Patent: Aug. 18, 2015

(54) METHOD AND SYSTEM FOR AUTOMATICALLY CAPTURING AN OBJECT USING A MOBILE TERMINAL

(71) Applicant: TENCENT TECHNOLOGY (SHENZHEN) COMPANY LIMITED, Shenzhen, Guangdong (CN)

(72) Inventors: Xiaolong Zhang, Shenzhen (CN); Jian Ding, Shenzhen (CN); Xiao Liu, Shenzhen (CN); Pinlin Chen, Shenzhen (CN); Hailong Liu, Shenzhen (CN); Junbin Kuang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 118 days.

(21) Appl. No.: 13/989,741

(22) PCT Filed: Apr. 28, 2013

(86) PCT No.: PCT/CN2013/075010
§ 371 (c)(1),
(2) Date: May 24, 2013

(87) PCT Pub. No.: WO2014/176746
PCT Pub. Date: Nov. 6, 2014

(65) Prior Publication Data
US 2014/0321752 A1  Oct. 30, 2014

(51) Int. Cl.
G06K 9/46 (2006.01)
G06K 9/66 (2006.01)
H04N 5/00 (2011.01)
H04N 1/00 (2006.01)
G06K 9/00 (2006.01)

(52) U.S. Cl.
CPC . *H04N 5/00* (2013.01); *H04N 1/00* (2013.01); *G06K 9/00442* (2013.01)

(58) Field of Classification Search
CPC ........ H04N 5/00; H04N 1/00; G06K 9/00442
USPC ........................................................ 382/190
See application file for complete search history.

(56) References Cited

U.S. PATENT DOCUMENTS 5,491,507 A    2/1996  Umezawa et al.
8,811,948 B2 * 8/2014  Bandyopadhyay et al. .. 455/411
(Continued)

FOREIGN PATENT DOCUMENTS

CN    101000623 A    7/2007
CN    101699839 A    4/2010

OTHER PUBLICATIONS

Tencent Technology (Shenzhen) Co. Ltd, International Search Report PCT/CN2013/075010, Jan. 30, 2014, 3 pgs.

*Primary Examiner* — Gregory M Desire
(74) *Attorney, Agent, or Firm* — Morgan, Lewis & Bockius LLP (57) ABSTRACT

A method for identifying relevant information of an object using a mobile terminal that has a built-in camera, a processor, and memory for storing programs to be executed by the processor is provided. The method includes automatically generating a plurality of image frames while the built-in camera pointing at the object; automatically transmitting one or more of the plurality of image frames to a remote server, wherein different transmitted image frames satisfy distinct predefined conditions; receiving information from the server when at least one of the transmitted image frames matches an image stored at the server, wherein the image corresponds to the object and is associated with information relevant to the object; and displaying the information relevant to the object at the mobile terminal.

14 Claims, 7 Drawing Sheets

(56) References Cited

U.S. PATENT DOCUMENTS 8,909,729 B2 * 12/2014 Rothschild .................... 709/217
2010/0109946 A1 * 5/2010 Pande ...................... 342/357.09
2010/0328418 A1 * 12/2010 Winkler ..................... 348/14.03
2013/0018701 A1 * 1/2013 Dusig et al. .................. 705/7.32

* cited by examiner

METHOD AND SYSTEM FOR AUTOMATICALLY CAPTURING AN OBJECT USING A MOBILE TERMINAL

CROSS REFERENCE TO RELATED APPLICATION

This Application is a United States National Stage Application filed under 35 U.S.C. §371 of PCT Patent Application Serial No. PCT/CN2013/075010 filed on Apr. 28, 2013, the contents of which are hereby incorporated in their entirety.

TECHNICAL FIELD

The disclosed implementations relate generally to object identification through image recognition, and in particular, to systems and methods for a mobile terminal to automatically determine the timing of uploading an image of an object to a remote server for identifying relevant information and the number of images to be uploaded without user intervention.

BACKGROUND

A mobile terminal is a portable device capable of audio and video communication, receiving and outputting information, and storing data. As the functionality of the mobile terminal has diversified, mobile terminals have developed sophisticated functions such as a capturing still or moving images (e.g., photographs or videos), reproducing music or video files, supporting games, receiving broadcasts, and communicating data wirelessly, as an all-in-one multimedia player. Various attempts have been made in terms of hardware or software to add more complicated features to the mobile terminal implemented as a multimedia player. One example is a feature for allowing a user to point a camera of the mobile terminal at an object, capture images of the object, and send the images to a remote server for further processing, such as retrieving relevant information about the object. A conventional implementation of such a feature is by the mobile terminal sending images of the object continuously to the remote server, without ceasing, until otherwise instructed by the remote server. Another conventional technology is that the user of the mobile terminal must actually trigger the sending of a request to the remote server by manually pushing a button to capture an image of the object.

The former conventional technology is convenient for the user as compared to the latter, but unfortunately requires the transfer of a large amount of image data to ensure image quality. These transfer cause inefficient use of network resources and burden the remote server. The latter conventional technology reduces the volume of network data transmission and ensures the quality of the images, but adds to the complexity of the operation by requiring manual user interaction.

In order to utilize the mobile terminal more efficiently, it would be effective to adopt computer vision technology into the operation of the mobile terminal such that (a) the only user action necessary is to point the camera of the mobile terminal at an object and to utilize image processing techniques automatically to determine the transition of the mobile terminal from a movement state to a standstill state, (b) to select only the captured image(s) which meet predefined conditions, (c) to send the selected images which meet predefined conditions to the remote server, and (d) to stop sending images automatically when instructed by the remote server.

SUMMARY

In accordance with some exemplary embodiments, described below is a method for identifying relevant information of an object using a mobile terminal, which has a built-in camera, one or more processors, a display screen, one or more antennas, an operating system (e.g., real-time pre-emptive multitasking), and memory (e.g., ROM, RAM, Flash) for storing programs to be executed by the processor. The programs include methods with the steps of automatically generating a plurality of image frames while the built-in camera pointing at the object; automatically transmitting one or more of the plurality of image frames to a remote server, wherein different transmitted image frames satisfy distinct predefined conditions; receiving information from the server when at least one of the transmitted image frames matches an image stored at the server, wherein the image corresponds to the object and is associated with information relevant to the object; and displaying the information relevant to the object at the mobile terminal.

In accordance with some exemplary embodiments, described below is a system for identifying relevant information of an object by a mobile terminal. The system includes an image capturing module for capturing automatically at least two consecutive image frames of the object to be recognized using a camera of the mobile terminal; an image stability module for analyzing the at least two consecutive image frames to determine if one image frame shows a stable status; an image contour detection module for determining a contour value of the stable image frame and comparing the determined contour value with a predefined threshold value; and an image transmission module for submitting the stable image frame to a remote server to retrieve relevant information of the object to be recognized if the determined contour value is larger than the predefined threshold value.

In accordance with some exemplary embodiments, described below is a non-transitory computer-readable medium in a mobile terminal, which has a built-in camera, one or more processors, a display screen, one or more antennas, an operating system (e.g., real-time pre-emptive multitasking), and memory (e.g., ROM, RAM, Flash) for storing programs to be executed by the processor where the instructions are for identifying relevant information of an object. The instructions include capturing at least two consecutive image frames of the object to be recognized using a camera of the mobile terminal; analyzing the at least two consecutive image frames to determine if one of the image frames shows a stable status; determining a contour value of the stable image; comparing the determined contour value with a predefined threshold value; and if the determined contour value is larger than the predefined threshold value, submitting the stable image frame to a remote server to retrieve relevant information of the object to be recognized.

BRIEF DESCRIPTION OF DRAWINGS

The aforementioned exemplary embodiments of the invention as well as additional embodiments will be more clearly understood as a result of the following detailed description of the various aspects of the invention when taken in conjunction with the drawings. Like reference numerals refer to corresponding elements throughout the several views of the drawings.

DETAILED DESCRIPTION

Figure 1:
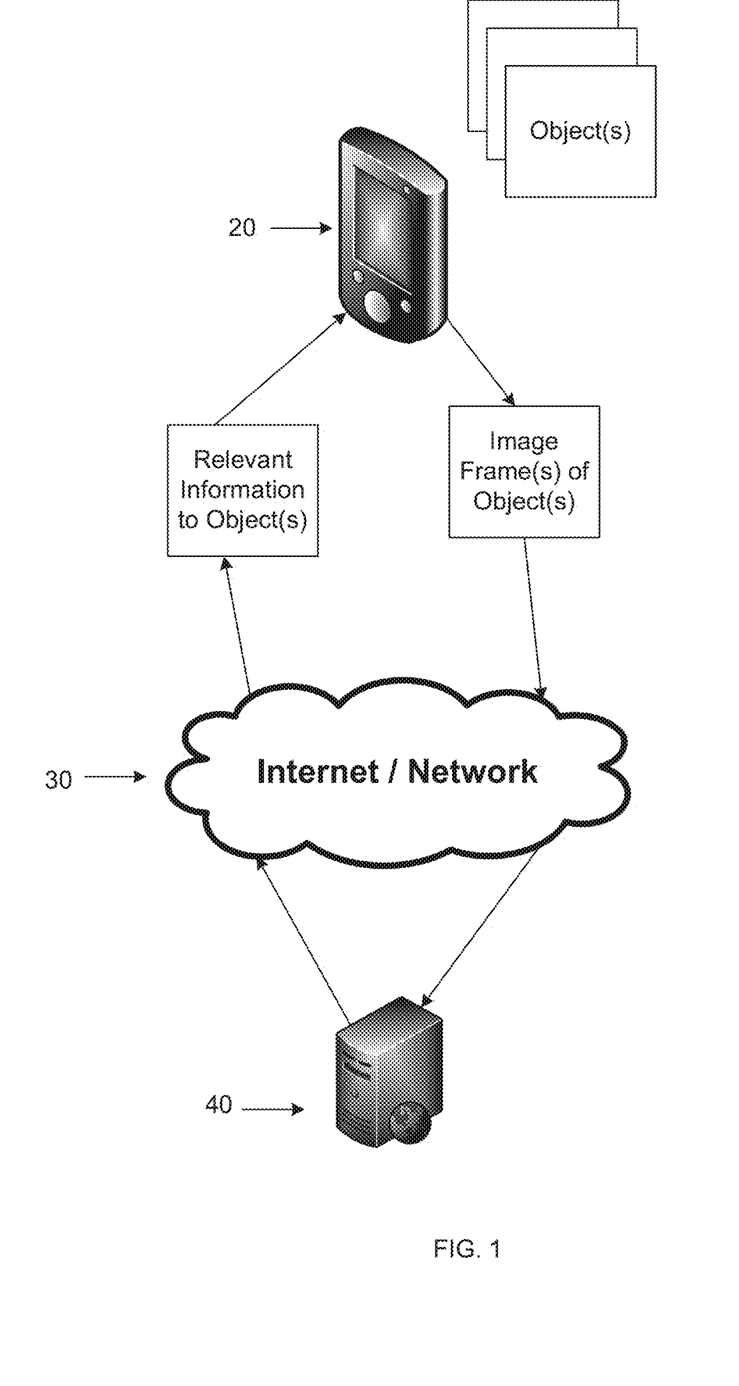
FIG. 1 is a block diagram illustrating an exemplary object(s), a client/mobile terminal, Internet/network, and remote server in accordance with an exemplary embodiment.

FIG. 1 is a block diagram illustrating an exemplary object(s), a client/mobile terminal 20, Internet/network 30, and remote server 40 in accordance with an exemplary embodiment. The exemplary embodiment is directed to a process of scanning an image using the camera of the client 20 and sending the image to the remote server 40 via, for example, the Internet 30 or other communications medium for determining what information is associated with the image. The remote server 40 processes the image using image processing/recognition techniques to identify what it reflects, performs an Internet or other search of databases based on the identity of the image, then returns the search results to the client 20. In other words, the process is akin to, for example, scanning a 2D code for retrieving relevant information. This process, however, is more useful than the 2D bar code scanning because it can be applied to objects which do not have a bar code.

Depending on the context, the client 20 in the present application may be a mobile terminal (e.g., a laptop, tablet, or smartphone) through which a user can access the Internet or other communications medium to which the remote server 40 is connected. For example, when the user wants to obtain the relevant information of an object such as a movie poster, the user points the client 20 to the movie poster so that the camera of the smartphone 20 could begin the automatic process of capturing an accurate image, transmitting the accurate image to the remote server 40, and identifying relevant information for the movie poster.

The automatic process of capturing an accurate image, transmitting the accurate image, and identifying relevant information is generally performed as follows. First, an image capturing process automatically scans for an image one or more times and sends the scanned images to the remote server 40. Scanning for an image does not require the user of the client 20 to press a button to capture the image. The user of the client 20 merely points the camera at the target and holds the client 20 for some time while images are captured automatically. After an accurate image(s) is captured, the client 20 transmits the accurate image to the remote server 40. Second, the image matching process which identifies relevant information corresponding to the accurate image is performed on the remote server 40. For example, if the transmitted image is a movie poster, the remote server 40 may identify via searching on the Internet or other database a website corresponding to the movie poster, then return to the client 20 the identified information.

Figure 1A:
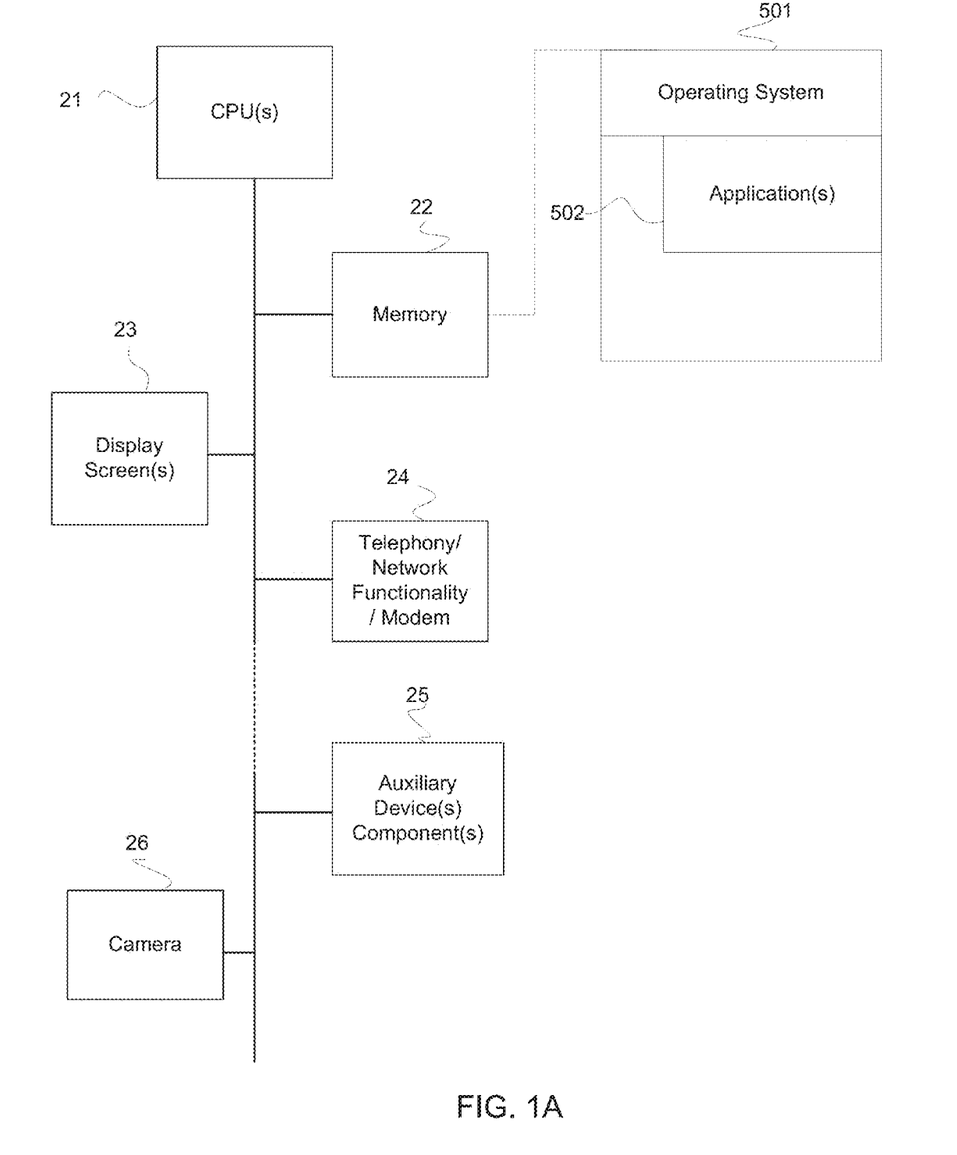
FIG. 1A is a block diagram illustrating an exemplary client/mobile terminal architecture in accordance with an exemplary embodiment.

FIG. 1A is a block diagram illustrating an exemplary client/mobile terminal architecture in accordance with an exemplary embodiment. As shown in FIG. 1A, the exemplary architecture includes one or more processors (CPU(s)) 21, memory 22, display screen(s) 23, telephony/network functionality/modem 24, an auxiliary device(s) component 25, and a camera 26. The memory may store an operating system 501 which may include one or more application(s) 502. In addition, third-party applications may also be installed in memory 22.

Figure 2A:
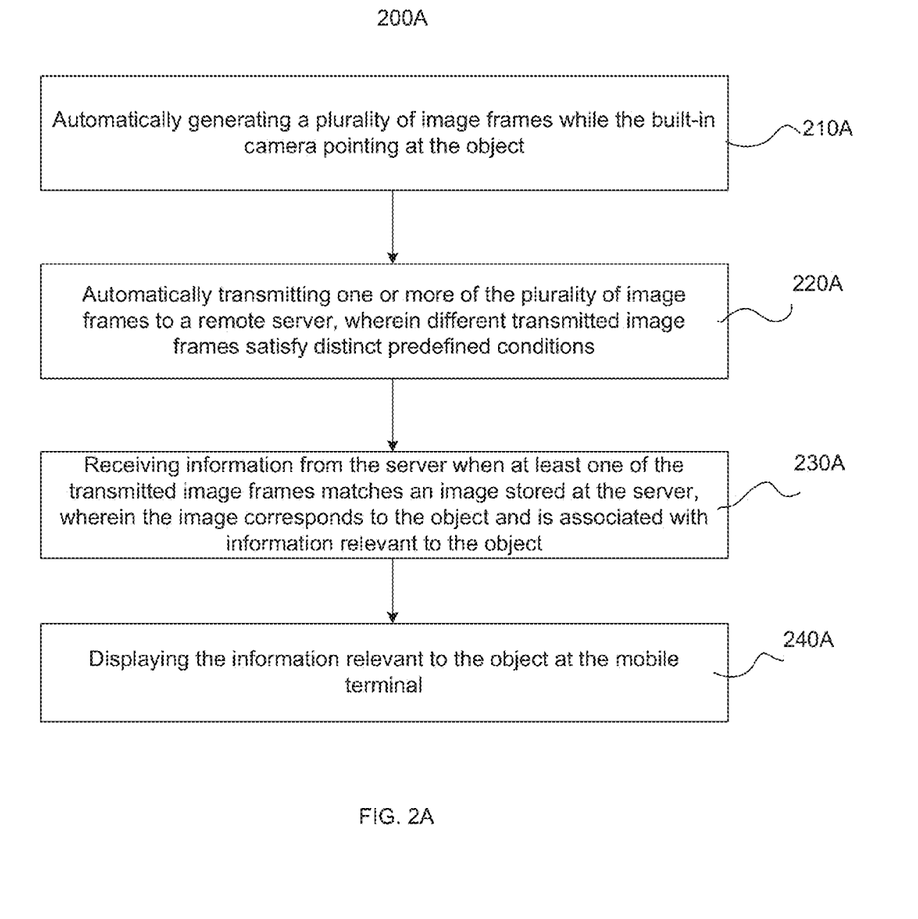
FIG. 2A is a flowchart illustrating the method steps for capturing an accurate image of an object, transmitting the accurate image to a remote server, and identifying relevant information of the object in accordance with an exemplary embodiment.

FIG. 2A is a flowchart 200A illustrating the method steps for capturing an accurate image of an object, transmitting the accurate image to the remote server 40, and identifying relevant information of the object in accordance with some exemplary embodiments.

As shown in FIG. 2A, at Step 210A, when the user points the camera of the client 20 at an object (when, for example, a particular application, such as We Chat, is executing on the client 20), the camera starts generating image frames of the object. The image frames may be generated even during a time when the client 20 transitions from a moving state to a still state.

At Step 220A, the client 20 automatically transmits one or more of the image frames to the remote server 40. The transmitted image frames may satisfy one or more distinct, predefined conditions. Those conditions include, but are not limited to, the following: (a) a difference between two consecutive image frames is less than a predefined threshold level; (b) an object contour detected in an image frame exceeds a predefined threshold level; (c) no relevant information is received from the remote server 40; (d) there is at least a predefined time period (e.g., 0.5 second) lapsed after the last transmission; and (e) a total number of image frames transmitted to the remote server 40 has not exceeded a predefined limit.

At Step 230A, the client 20 receives information from the remote server 40 when at least one of the transmitted image frames matches an image, or data corresponding to the image frames and identified, stored at the remote server 20 or accessible via an Internet search or local/remote database. The matching image or data corresponding to the transmitted image frames is associated with information relevant to the object. The information relevant to the object is communicated from the remote server 40 to the client 20.

The client 20 receives the information relevant to the object from the remote server 40 and, at Step 240A, displays the information relevant to the object to the user on its display screen 23. The client 20 may store the information relevant to the object in memory 22.

Figure 2B:
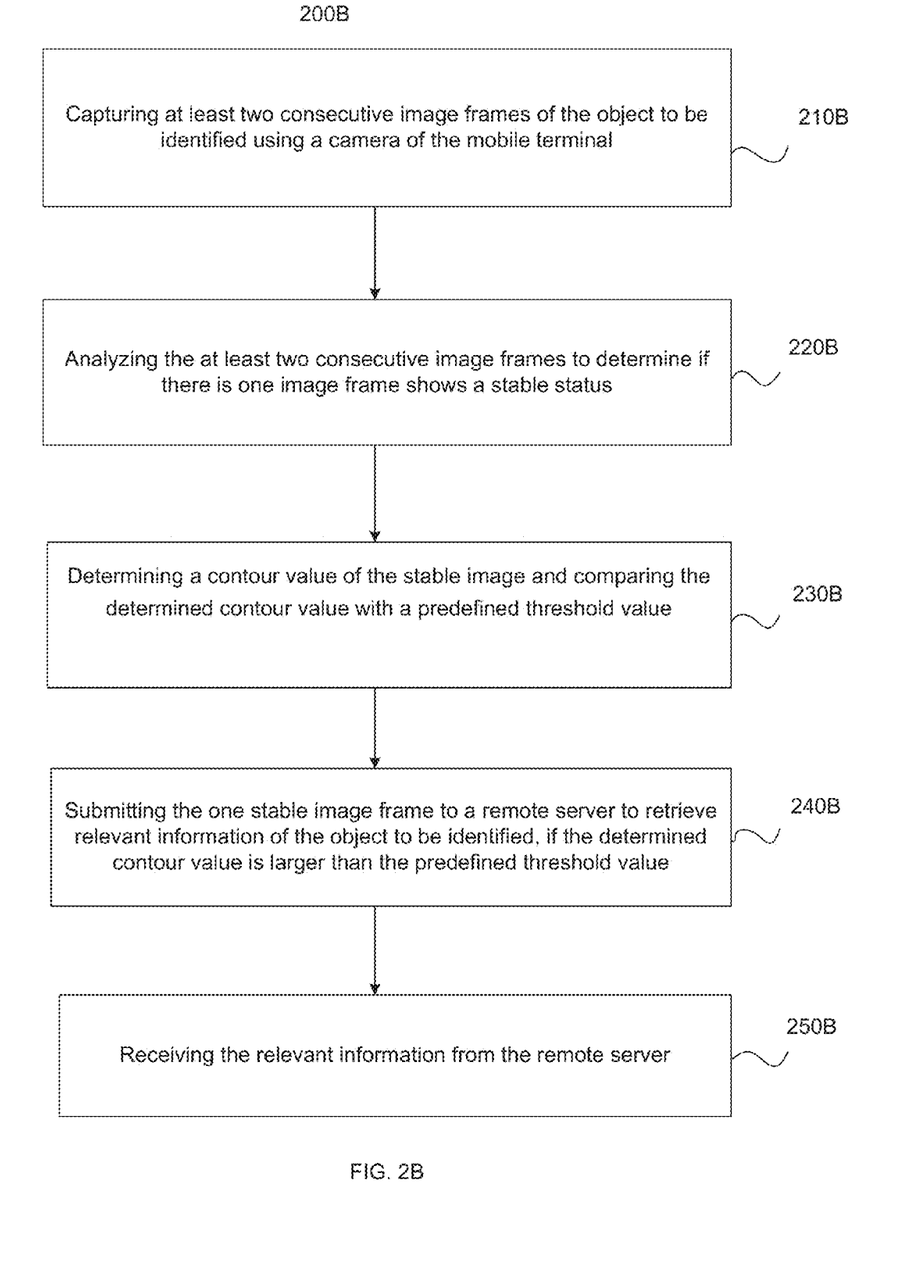
FIG. 2B is yet another flowchart illustrating the method steps for capturing an accurate image of an object, transmitting the accurate image to the remote server, and identifying relevant information of the object in accordance with an exemplary embodiment.

FIG. 2B is a flowchart 200B illustrating the method steps for capturing an accurate image of an object, transmitting the accurate image to the remote server 40, and identifying relevant information of the object in accordance with some exemplary embodiments.

As shown in FIG. 2B, at Step 210B, when the user points the camera of the client 20 at an object (when, for example, a particular application, such as We Chat, is executing on the client 20), the camera starts generating image frames of the object. The image frames may be generated even during a time when the client 20 transitions from a moving state to a still state.

At step 220B, a stability predetermination process activates a graphic algorithm (described along with FIG. 3, below) available on the client 20. In some embodiments, the graphic algorithm may be part of an application such as We Chat. In some embodiments, the graphic algorithm may be part of a third-party application which is invoked at Step 210B. The graphic algorithm automatically determines the stability of the captured image frames, from Step 210B, so that at least one image frame (of, for example, at least two image frames) with a stable status can be selected as an accurate image frame corresponding to the object. The selected accurate image frame may be sent to the remote server 40.

At Step 230B, in order to ensure the accuracy of the image frame which is transmitted to the remote server 40, a contour of an objection in the image frame is detected using known techniques, e.g., Hough transform. For example, if the object in the image frame is a business card, the mission of contour detection is to detect a rectangular shape in the image frame. To do so, the image frame is first subject to Hough transform. Next, the edge elements found in the image frame is identified, from which one or more line segments are extracted. Different line segments are compared based on their respective starting points, ending points and directions to determine whether there are one or more pairs of parallel line segments, and if so, whether the pairs of parallel line segments can form a rectangular shape. Finally, the determined contour value is then compared with a predefined threshold value. If the determined contour value exceeds the threshold value, then the image frame is deemed to be stable and can be transmitted to the remote server. At Step 240B, the image frame which is stable is transmitted to the remote server 40.

At Step 250B, when the remote server receives the stable image frame, it performs an image analysis of the image frame. Based on the results of the analysis, a search query is performed on the Internet and on accessible database repositories for retrieving information relevant to the image frame. In some embodiments, if the image frame matches closely any image (or other data) stored or accessible by the remote server 40, relevant information about the image may be sent to the client 20. If no information accessible to the remote server 40 matches the results of the analysis, an appropriate message is communicated to the client 20.

Figure 3:
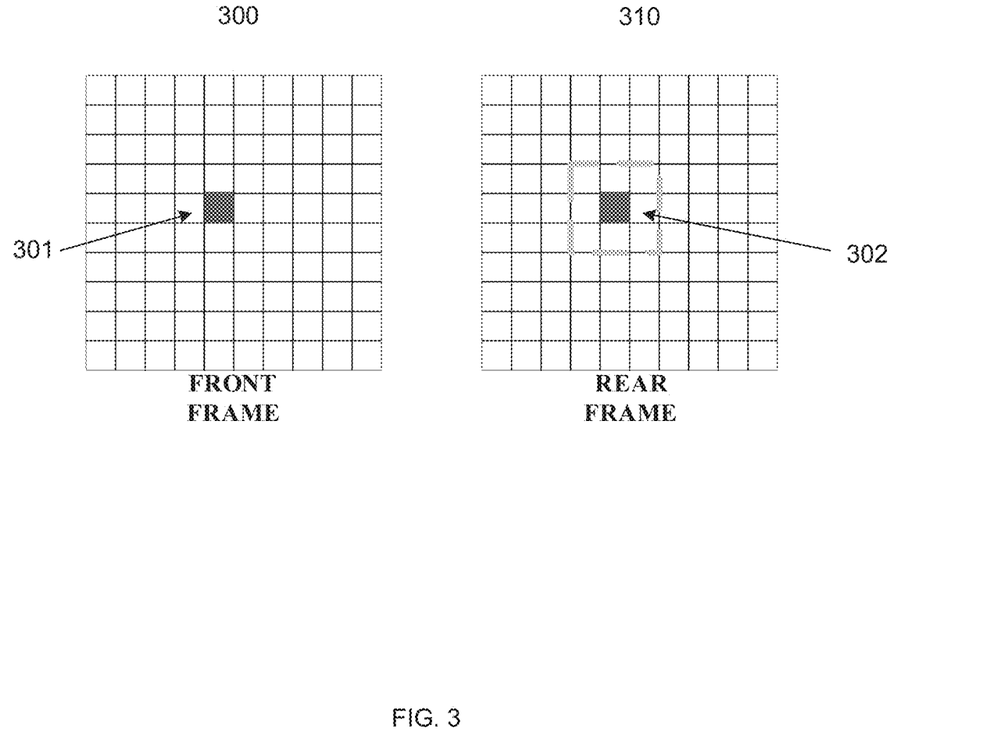
FIG. 3 illustrates a diagram of a simple operation using a graphic algorithm on pixels of two image frames 300 and 310 captured consecutively in accordance with an exemplary embodiment.

FIG. 3 illustrates a diagram of a simple operation using the graphic algorithm on pixels of two image frames 300 and 310 captured consecutively (for example, according to Step 220B) in accordance with an exemplary embodiment. The graphic algorithm determining the stability of an image by fetching, for example, image frames 300 and 310 from a real-time video (or, sequential image frames) captured by the camera of the client 20. The real-time video (or, sequential image frames) may be captured according to a time interval. The graphic algorithm determines the stability status of the image frames (a description of the graphic algorithm is provided below for FIG. 3). The graphic algorithm determines stability by calculate a difference among the frames according to, for example, movement of the image pixels from one location to another location (as shown). Then, according to the difference, the graphic algorithm may assign a stability status of the image frames. The stability status may be: (1) unstable, (2) unstable-to-stable status, (3) stable status, or (4) stable-to-unstable status.

As shown in FIG. 3, according to the graphic algorithm, each small grid represents a pixel of a current image frame. When determining if an image is stable or otherwise unstable due to movement, for example, two consecutive image frames 300 and 310 may be used. A pixel-by-pixel comparison of the image frames 300 and 310 is performed to determine stability. Each pixel may be assigned a status such as either dynamic or static. The determination of whether the image frames 300 and 310 are stable may be made according to the percentage of the static pixels, for example. The greater the percentage of static pixels, the more likely that the algorithm will determine that the image is stable based on the comparison of the image frames 300 and 310. Similarly, the greater the difference between the images frames 300 and 310, the more likely the algorithm will determine that the image is unstable. In gray-scale image processing, the algorithm may first, prior to comparison, assign each pixel of the image frames 300 and 310 a value of between 0-255. For example, as shown in FIG. 3, an image pixel 301 of the front image frame 300 has a fixed pixel value. In the rear image frame 310, if the graphic algorithm detects that an image pixel 302, which is similar to the image pixel 301 (e.g., same color or same gray-scale value) is present within a certain area (the dotted line area), the center of which is the image pixel 301, then image pixel 302 would be considered as a static pixel (an indicator of greater image stability). The graphic algorithm iteratively analyzes other regions between the two consecutive image frames 300 and 310 and determines whether each region is stable or unstable. When the result of the graphic algorithm analysis of image frames 300 and 310 transitions, for example, from an unstable status to a stable status, the image transmission module may subsequently transmit the stable image frame to the remote server 40. In some embodiments, prior to transmission, the stable image frame may undergo contour detection.

Figure 4:
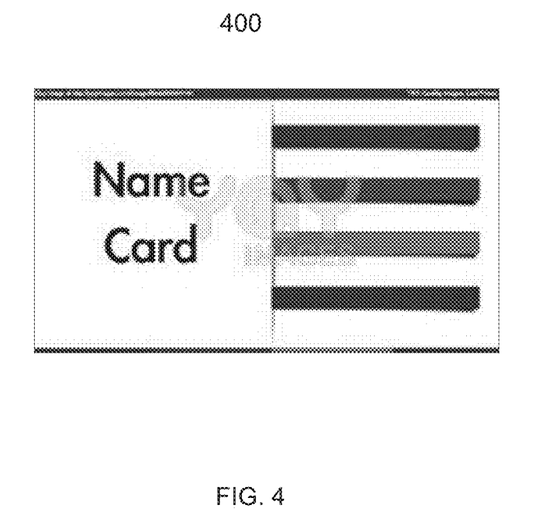
FIG. 4 illustrates an exemplary view of a contour detection process in accordance with an exemplary embodiment.

FIG. 4 illustrates an exemplary view of a contour detection process, as shown in FIG. 2B, in accordance with an exemplary embodiment. In order to further ensure the accuracy of the image transmitted to the remote server 40, contour detection may be performed to determine whether an ordinary contour of the object can be detected. In some embodiments, if an ordinary contour of the object can be detected, then image frame is selected and transmitted to the remote server 40.

FIG. 4 illustrates a name card 400. In some embodiments, contour detection may be performed using Hough transform. In automated analysis of digital images, simple shapes such as straight lines, circles or ellipses are often detected. In some instances, an edge detector can be used during pre-processing of the image to obtain image points or pixels that are on the desired curve in the image space. Due to imperfections in either the image data or the edge detector, however, there may be missing points or pixels on the desired curves as well as spatial deviations between the ideal line/circle/ellipse and the noisy edge points as they are obtained from the edge detector. Accordingly, it is often non-trivial to group the extracted edge features to an appropriate set of lines, circles or ellipses. The Hough transform addresses these concerns by making it possible to group edge points into object candidates using an explicit voting procedure over a set of parameterized image objects.

In the exemplary embodiment of FIG. 4, the contour detection algorithm first detects whether there is a rectangular shape in the image frame of the name card 400. Then, by using an image processing method, the Hough transform is computed with respect to a gray scale of the image frame. In the Hough transform, image segmentation is used to find edge elements and straight lines, and then a starting point, ending point and direction of each of the straight lines are used to detect parallel lines. After that, the parallel lines are combined to form an initial rectangle, and finally the initial rectangle is merged into a rectangle as the determined contour value of the image frame.

The determined contour value is compared with a predetermined threshold value. If it is larger than the predetermined threshold value, it is detected that a contour of the object exists in the image frame, and the image frame is selected and sent to the remote server for image identification. If it is smaller than the predetermined threshold value, it is detected that the contour of the object does not exist in the image frame, and then the image frame is not selected for sending to the remote server.

Exemplary embodiments are not limited to detecting only the shapes of object, but are capable of capturing a single word or phrase for translation. For example, if the user would like to translate the word "astrobiology" into another language, the camera of the mobile terminal can single out this word such that there are white margins separating this object from other words as shown below.

> Dr. Felisa Wolfe-Simon is a NASA Astrobiology Research Fellow in residence at Lawrence Berkeley National Laboratory. Her expertise broadly covers the intersection between biology and geology with a focus in astrobiology. The focus of her work deliberates on "what chemical elements can support microbial life on Earth?"

After capturing this single word, the mobile terminal can perform an edge detection of this word among many words to successfully identify the word's image. Then the identified image can be sent to the remote server 40 in which an optical character recognition (OCR) may be utilized for translation process. It should be noted that exemplary embodiments are not limited to single out one word, but the same or similar techniques could be applied to capture a sentence or the whole paragraph to send to the remote server for further processing. In some embodiments, captured words, phrases, sentences or paragraphs could also be subject to the described searching or processing of an object by the remote server 40 for retrieving any relevant information.

In some embodiments, prior to transmission of the selected image frame to the remote server 40, the client 20 may consider: (1) if the image frame is in a stable status or transitions from unstable status to stable status; (2) if the image frame with a stable status has a contour value that is larger than a predetermined threshold; (3) if a satisfied feedback has not been received from the remote server; (4) if the time period of transmitting the image frame meets an image transmission time interval; and (5) if the amount of data for transmission would not exceed a maximum amount allotted for transmitting image frames. If any of the foregoing conditions is not satisfied, the client 20 may terminate the transmission of the image frame to the remote server 40.

Figure 5:
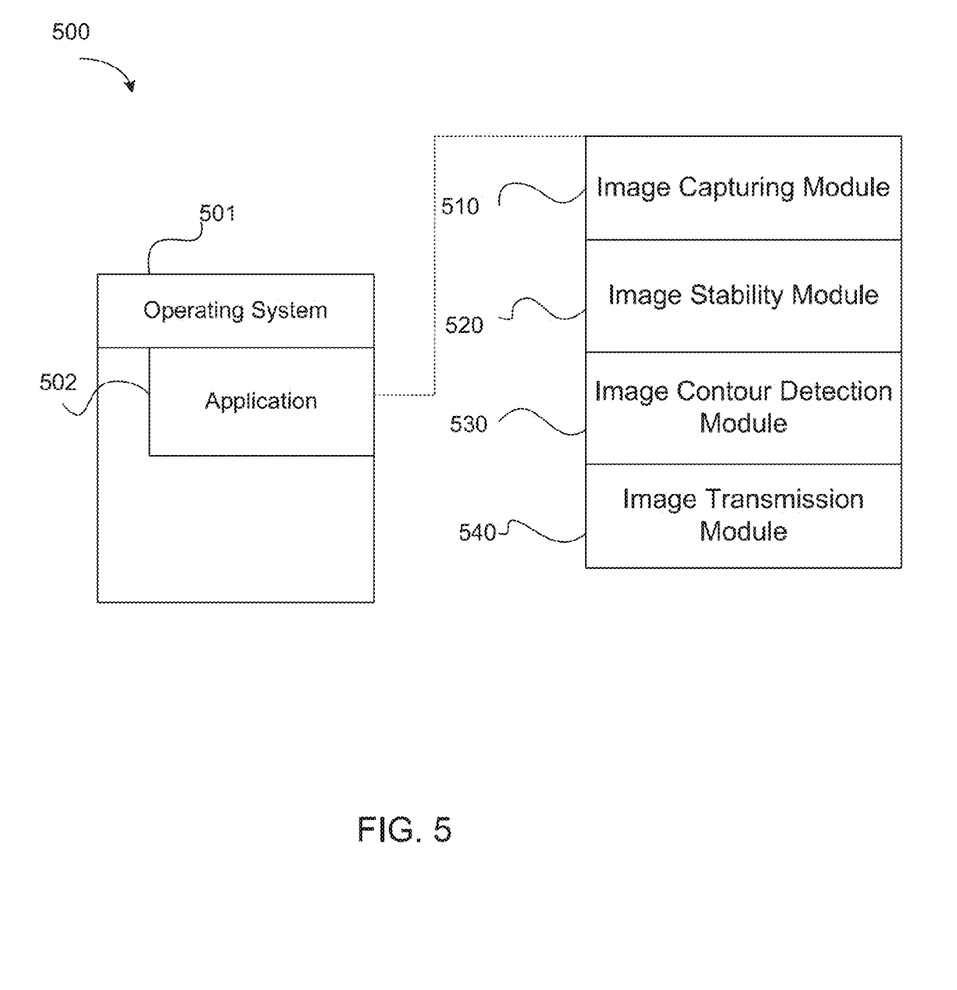
FIG. 5 is a block diagram illustrating some components of an application of a mobile terminal in accordance with an exemplary embodiment.

FIG. 5 is a block diagram illustrating some components of an application of a mobile terminal in accordance with an exemplary embodiment. In some embodiments, an application implemented on the client 20 determines when to upload a captured accurate image to the remote server 40, without user intervention, as described above.

As shown in FIG. 5, an exemplary system 500 of the mobile terminal 20 includes an operating system 501 running an application 502. The application 502 may be native to the operating system 501 or from a third-party. In some embodiments, the application 502 may include an image capturing module 510, an image stability module 520, an object contour detection module 530, and an image transmission module 540. Each of these modules 510-540 may include on or more sub-modules or be implemented together as one or more modules with departing from the scope of the invention. Moreover, in some embodiments each of these modules, sub-modules, or a combination, may perform the steps described above for FIGS. 2A-B and 3-4.

Reference has been made in detail to implementations, examples of which are illustrated in the accompanying drawings. While particular implementations are described, it will be understood it is not intended to limit the invention to these particular implementations. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method for identifying relevant information of an object using a mobile terminal that has a built-in camera, a processor, and memory for storing programs to be executed by the processor, comprising the steps of:
   automatically generating a plurality of image frames while the built-in camera pointing at the object;
   automatically transmitting one or more of the plurality of image frames to a remote server, wherein different transmitted image frames satisfy distinct predefined conditions;
   receiving information from the remote server when at least one of the transmitted image frames matches an image stored at the remote server, wherein the image corresponds to the object and is associated with information relevant to the object;
   displaying the information relevant to the object at the mobile terminal; and
   stopping transmitting any image frames to the remote server after receiving the information relevant to the object.

2. A method for identifying relevant information of an object using a mobile terminal that has a built-in camera, a processor, and memory for storing programs to be executed by the processor, comprising the steps of:
   capturing at least two consecutive image frames of the object to be recognized using a camera of the mobile terminal;
   analyzing the at least two consecutive image frames to determine if there is one image frame shows a stable status;
   determining a contour value of the stable image;
   comparing the determined contour value with a predefined threshold value;
   if the determined contour value is larger than the predefined threshold value, submitting the stable image frame to a remote server to retrieve relevant information of the object to be recognized;
   receiving the relevant information from the remote server; and
   stopping submitting any image frames to the remote server after receiving the relevant information from the remote server.

3. The method according to claim 2, wherein the image capturing comprises:
   automatically activating an image scanning program while the camera of the mobile terminal pointing at the object to be recognized,
   wherein the consecutive image frames are automatically captured while the mobile terminal is in a process of being held for a stop.

4. The method according to claim 2, wherein the analyzing step comprises:
   calculating a difference between the two consecutive frames such that if the difference satisfies a predetermined condition, a latter one of the two consecutive frames is uploaded and transferred to the remote server.

5. The method according to claim 2, wherein the determining the contour value comprises performing Hough transform with respect to the stable image frame to recognize a pattern of the object to be recognized.

6. The method according to claim 2, wherein the comparing step comprises discarding the stable image frame if a comparison result is less than the predefined threshold value.

7. The method according to claim 2, wherein the submitting step further comprises stopping sending the stable image frame to the remote server if a sending time interval is not satisfied or a maximum data volume is reached.

8. The method according to claim 2, further comprising:
   associating with an optical character recognition (OCR) process of converting the one stable image into machine-encoded text.

9. A system for identifying relevant information of an object by a mobile terminal, comprising:
   an image capturing module for capturing at least two consecutive image frames of the object to be recognized using a camera of the mobile terminal;
   an image stability module for analyzing the at least two consecutive image frames to determine if there is one image frame shows a stable status;
   an image contour detection module for determining a contour value of the stable image frame and comparing the determined contour value with a predefined threshold value; and
   an image transmission module for:
      submitting the stable image frame to a remote server to retrieve relevant information of the object to be recognized if the determined contour value is larger than the predefined threshold value; and
      stopping submitting any image frames to the remote server after receiving the relevant information of the object from the remote server.

10. The system according to claim 9, wherein the image capturing module activates an image scanning program when the camera of the mobile terminal points to the object to be recognized, and automatically captures the consecutive image frames while the mobile terminal transitions from a moving mode to a standstill mode.

11. The system according to claim 9, wherein the image predetermining module calculates a difference between the two consecutive frames such that if the difference satisfies a predetermined condition, a latter one of the two consecutive frames is uploaded for sending to the remote server.

12. The system according to claim 9, wherein the image contour detection module performs Hough transform with respect to the stable image frame to recognize a pattern of the object to be recognized, and discards the stable image frame if a comparison result is less than the predefined threshold value.

13. The system according to claim 9, wherein the image transmission module stops sending the stable image frame to the remote server if a sending time interval is not satisfied or a maximum data volume is reached.

14. The system according to claim 9, wherein the system is connected with an optical character recognition (OCR) processor that converts the stable images into machine-encoded text.

* * * * *